United States Patent
Balan et al.

(10) Patent No.: US 10,546,426 B2
(45) Date of Patent: Jan. 28, 2020

(54) REAL-WORLD PORTALS FOR VIRTUAL REALITY DISPLAYS

(71) Applicant: Microsoft Technology Licensing, LLC, Redmond, WA (US)

(72) Inventors: Alexandru Octavian Balan, Sammamish, WA (US); Youding Zhu, Sammamish, WA (US); Min shik Park, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 15/886,764

(22) Filed: Feb. 1, 2018

(65) Prior Publication Data

US 2019/0213793 A1     Jul. 11, 2019

Related U.S. Application Data

(60) Provisional application No. 62/614,142, filed on Jan. 5, 2018.

(51) Int. Cl.
| | |
|---|---|
| *G06T 19/00* | (2011.01) |
| *G06T 15/20* | (2011.01) |
| *G06F 3/01* | (2006.01) |
| *G02B 27/01* | (2006.01) |

(52) U.S. Cl.
CPC .......... *G06T 19/006* (2013.01); *G02B 27/017* (2013.01); *G06F 3/011* (2013.01); *G06T 15/20* (2013.01); *G06T 19/003* (2013.01)

(58) Field of Classification Search
CPC ...... G06T 19/006; G02B 27/017; G06F 3/011
See application file for complete search history.

(56) References Cited

U.S. PATENT DOCUMENTS

| | | | | |
|---|---|---|---|---|
| 8,947,455 | B2* | 2/2015 | Friesen | G06F 3/011 345/633 |
| 2006/0241792 | A1* | 10/2006 | Pretlove | G06F 3/011 700/83 |
| 2013/0321462 | A1 | 12/2013 | Salter et al. | |
| 2017/0045941 | A1* | 2/2017 | Tokubo | G06F 3/167 |
| 2017/0061696 | A1 | 3/2017 | Li et al. | |
| 2018/0005421 | A1 | 1/2018 | Park et al. | |
| 2018/0095542 | A1* | 4/2018 | Mallinson | G06F 1/163 |
| 2018/0173323 | A1* | 6/2018 | Harvey | G06T 19/006 |
| 2018/0260032 | A1* | 9/2018 | Norieda | G06T 7/11 |

OTHER PUBLICATIONS

"International Search Report and Written Opinion Issued in PCT Application No. PCT/US2018/066099", dated Apr. 24, 2019, 12 Pages.

* cited by examiner

*Primary Examiner* — Lixi C Simpson
(74) *Attorney, Agent, or Firm* — Alleman Hall Creasman & Tuttle LLP (57) ABSTRACT

A virtual reality scene is displayed via a display device. A real-world positioning of a peripheral control device is identified relative to the display device. Video of a real-world scene of a physical environment located behind a display region of the display device is captured via a camera. A real-world portal is selectively displayed via the display device that includes a portion of the real-world scene and simulates a view through the virtual reality scene at a position within the display region that tracks the real-world positioning of the peripheral control device.

20 Claims, 8 Drawing Sheets

REAL-WORLD PORTALS FOR VIRTUAL REALITY DISPLAYS

CROSS REFERENCE TO RELATED APPLICATIONS

This application claims priority to U.S. Provisional Patent Application Ser. No. 62/614,142, filed Jan. 5, 2018, the entirety of which is hereby incorporated herein by reference for all purposes.

BACKGROUND

Virtual reality is typically achieved in the visual domain through the use of graphical displays that occlude the user's view of the surrounding physical environment. Head-mounted display (HMD) devices utilizing near-eye graphical displays may be used to provide a fully immersive virtual reality experience. HMD devices may be accompanied by handheld controllers that enable the user to interact with the virtual reality environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an aspect of the present disclosure, a virtual reality scene is displayed via a display device. The display device may take the form of a near-eye HMD device, for example. A real-world positioning of a peripheral control device is identified relative to the display device. The peripheral control device may take the form of a handheld controller, for example. Video of a real-world scene of a physical environment located behind a display region of the display device is captured via a camera. The camera may take the form of an outward facing camera of an HMD device that approximates a visual perspective of a person wearing the HMD device, for example. A real-world portal is selectively displayed via the display device that includes a portion of the real-world scene and simulates a view through the virtual reality scene at a position within the display region that tracks the real-world positioning of the peripheral control device.

A user may select whether the real-world portal is displayed at a given point in time, and may manipulate the peripheral control device while operating in a flashlight mode of operation to visualize the surrounding environment via the display device while maintaining the virtual reality context. Additional modes of operation include a view-lock mode in which a point in physical space may be maintained within the real-world portal even if the peripheral control device is repositioned, and a portal-lock mode that enables the position of the real-world portal within the display region to be relocated without continuing to track the real-world positioning of the peripheral control device.

DETAILED DESCRIPTION

Figure 1:
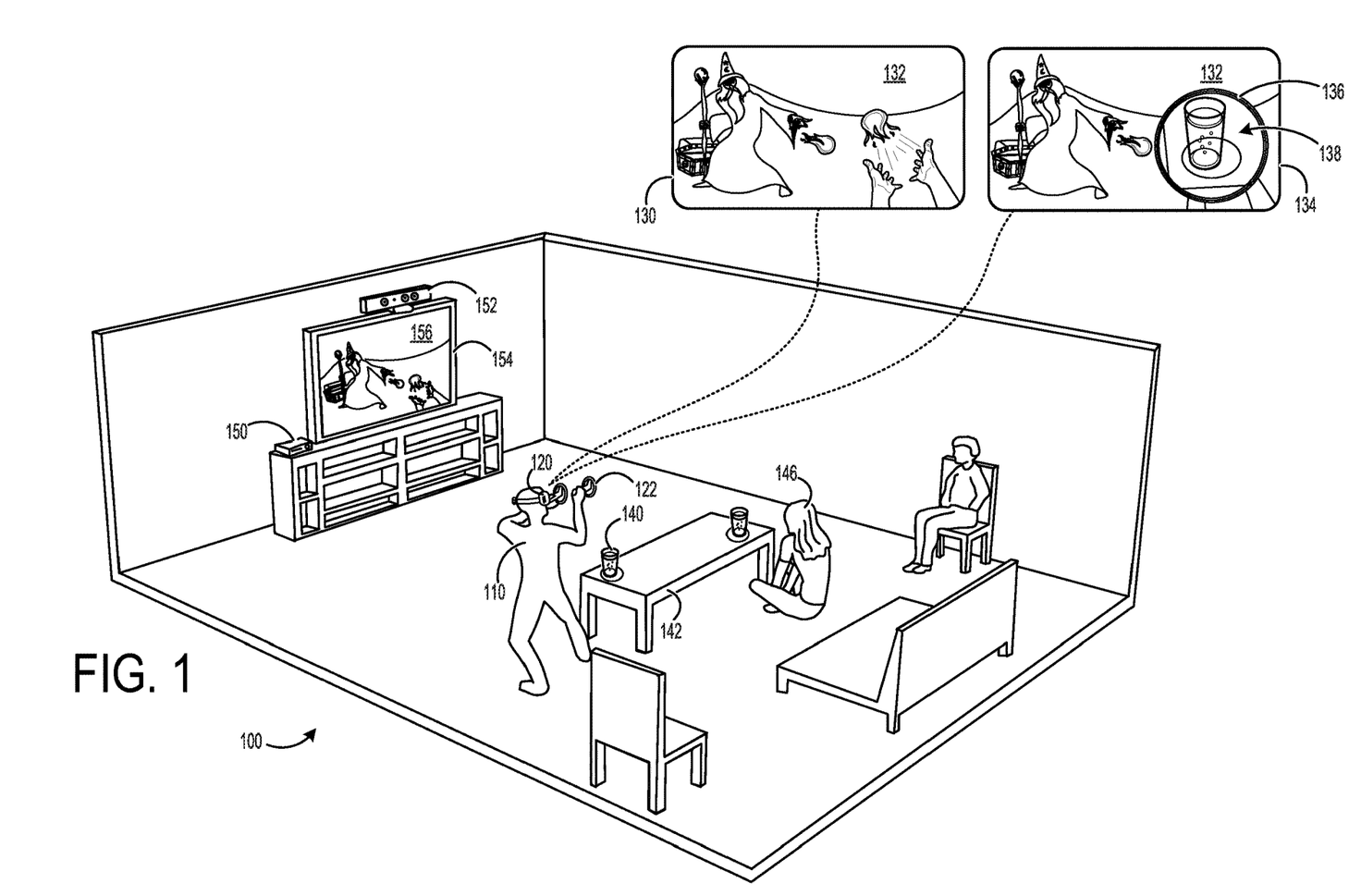
FIG. 1 depicts an example use environment in which a user is presented a virtual reality experience that includes a real-world portal.

FIG. 1 depicts an example use environment 100 in which a user 110 is presented a virtual reality experience that includes a real-world portal. In this example, user 110 is wearing a head-mounted display (HMD) device 120 that displays graphical content. A first example view 130 of HMD device 120 is also depicted in FIG. 1. View 130 includes a virtual reality scene 132 that may be viewed by user 110 via HMD device 120.

In FIG. 1, user 110 is also holding at least one peripheral control device 122 that enables the user to interact with a virtual reality environment. For example, user 110 is manipulating peripheral control device 122 to direct a virtual fireball at a virtual wizard, as depicted by virtual reality scene 132. The peripheral control device may take the form of a handheld controller, for example. In at least some implementations, a user may hold a first peripheral control device in a left hand and a second peripheral control device in a right hand to provide independent hand-based control.

A second example view 134 of HMD device 120 is also depicted in FIG. 1, which may be selectively presented to user 110 while a real-world viewing mode is engaged. In this example view 134, video of a real-world scene 138 of the physical environment located behind a display region of HMD device 120 is captured via a camera. The camera may take the form of an outward facing camera of HMD device 120 that approximates a visual perspective of user 110. A real-world portal 136 is also displayed via HMD device 120 that includes at least a portion of the real-world scene. For example, real-world portal 136 depicts a glass of beer 140 of user 110 that is resting on a table 142. In some implementations, user 110 may select whether real-world portal 136 of view 134 is displayed at a given point in time by engaging the real-world viewing mode. User 110 may also disengage the real-world viewing mode to return to view 130 in which a virtual reality scene is displayed without a real-world portal being displayed. In other implementations engagement/disengagement of the real-world viewing mode may be automated by logic of a virtual reality system (e.g., HMD device 120).

Within the real-world viewing mode, several different modes of operation may be available to the user. In at least one mode of operation, referred to as a flashlight mode, real-world portal 136 simulates a view through virtual reality scene 132 at a position within the display region that tracks a real-world positioning of peripheral control device 122.

Once the real-world viewing mode is engaged, user 110 may manipulate peripheral control device 122 similar to a flashlight to visualize a portion of the surrounding physical environment via the HMD device while simultaneously maintaining the view of a virtual reality scene. For example, user 110 may aim peripheral control device 122 from the glass of beer 140 to a person 146 to cause the real-world portal 136 to move and display that person. Within the real-world viewing mode, physical objects that are present within the real-world scene may be displayed in real-world portal 136 at the same apparent real-world scale from the perspective of the user as they actually exist in the physical environment. Other modes of operation may be supported, including a view-lock mode that maintains a view of a fixed point/area/object in physical space and a portal-lock mode that locks the position of the real-world portal at a selected portion of the display region, as will be described in further detail with reference to FIGS. 2 and 3.

The real-world portal disclosed herein enables a user engaged in an immersive virtual reality experience to, for example, view people around the user to identify and engage in a conversation, view and perform text entry using a physical keyboard, locate surrounding objects such as furniture or other obstacles, place a peripheral control device or other object on a table or other surface, locate and pick up a glass of beer or other physical object, locate and silence a phone or other communication device, etc. In at least some implementations, the real-world scene included within the real-world portal may be presented in high quality and in true color to provide users with an intuitive and accurate depiction of their physical surroundings. Furthermore, the real-world scene may be accurately positioned and scaled within the portal such that the portal simulates a view the user would have if the user looked at that portion of the real-world scene directly with his/her own eyes.

Also within environment 100, a variety of other hardware components are present, including a computing device 150, one or more optical sensor(s) 152, and a display device 154. In some examples, computing device 150 may take the form of a gaming console, and HMD device 120 and peripheral control device 122 may be peripheral to the gaming console. In other examples, peripheral control device 122 may be peripheral to the HMD device 120, and the HMD device 120 may not be peripheral to another computing device. HMD device 120 and peripheral control device 122 may communicate with computing device 150 via wired and/or wireless communication links. Also in this example, display device 154 is displaying a conventional view 156 that simulates the view of user 110 for other persons (e.g., person 146) not immersed in the virtual reality experience. In contrast to view 134 that includes real-world portal 136, view 156 may not contain a real-world portal even if the real-world viewing mode is engaged by user 110. View 156 may be displayed on virtually any local or remote display device.

Figure 2:
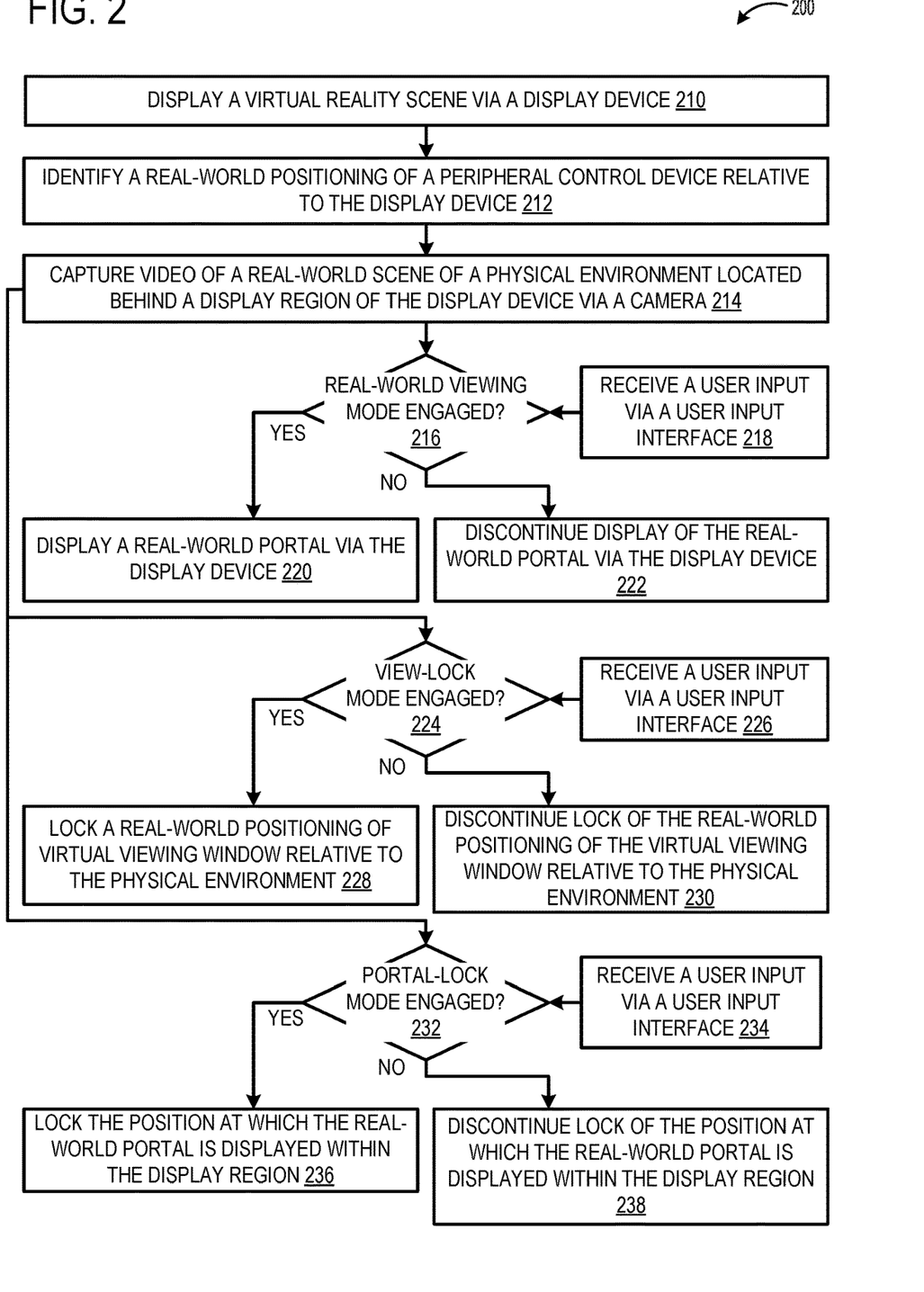
FIG. 2 depicts an example method 200 for displaying a real-world portal within the context of a virtual reality experience.

FIG. 2 depicts an example method 200 for displaying a real-world portal within the context of a virtual reality experience. Method 200 may be performed by a computing system of one or more computing devices (e.g., HMD device 120, computing device 150, HMD device 430 of FIG. 4, and/or computing device 410 of FIG. 4).

At 210, the method includes displaying a virtual reality scene via a display device. The virtual reality scene may include any form of virtual reality content, including virtual three-dimensional worlds, gaming content, user interface content, etc. In at least some implementations, the display device is an HMD device. For example, the HMD device may be a near-eye HMD device that occludes a user's view of the surrounding physical environment. However, other display devices may be used, including mobile or tablet display devices, for example. A display device may include one or more on-board sensors as will be described in further detail with reference to the example head-mounted display device of FIG. 4.

At 212, the method includes identifying a real-world positioning of a peripheral control device relative to the display device. In at least some implementations, the display device and the peripheral control device are each associated with their own respective reference frame. By identifying the real-world positioning of the peripheral control device relative to the display device, the real-world positioning of one of the display device or peripheral device within its reference frame may be translated or otherwise mapped to the reference frame of the other of the display device or peripheral device (or to any other shared reference frame or coordinate system). For example, a real-world positioning of the peripheral control device within a first reference frame may be translated to a second reference frame of the display device. The real-world positioning may be represented in a reference frame as a six degree of freedom (6DOF) positioning in physical space. In an example, the real-world positioning of the peripheral control device within a reference frame of the display device may be identified using one or more cameras located on-board the display device to capture a constellation of visual markers located on-board the peripheral control device. Additionally or alternatively, the peripheral control device and the HMD device may each include one or more on-board sensors (e.g., camera(s), accelerometer(s), gyroscope(s), magnetometer) that cooperatively provide an indication of their respective 6DOF positioning in physical space. The gravitational vector and/or magnetic vector detected by sensors located on-board each device may be used to align or otherwise map reference frames of the devices to each other, for example. Additionally or alternatively, one or more cameras remotely located from the HMD device and peripheral control device may capture each device to identify a relative positioning of each device relative to each other in 6DOF.

In at least some implementations, the peripheral control device is a handheld controller. A user may use one or more peripheral control device(s). For example, a user may hold a first peripheral control device in a left hand and a second peripheral control device in a right hand. A peripheral control device may include one or more user input interfaces, such as one or more depressible buttons, joysticks, multi-directional pads, scroll wheels, touch-sensitive surfaces, etc. A peripheral control device may include one or more on-board sensors as will be described in further detail with reference to the example peripheral control device of FIG. 4. In some implementations, a mobile phone, tablet, or other device may function as a peripheral control device.

At 214, the method includes capturing, via a camera, video or other imagery (e.g., one or more static images) of a real-world scene of a physical environment located behind a display region of the display device. The camera has a field of view of the physical environment, and the peripheral control device may be moved into the camera's field of view, for example. In at least some implementations, the camera is an outward facing camera of a head-mounted display device. The outward facing camera may approximate a visual perspective of a person wearing the head-mounted display device. Alternatively, the camera may be located on-board the peripheral control device. For example, a camera on-board the peripheral control device may be an outward and/or forward facing camera when the peripheral control device is held by a user in at least one hand orientation (e.g., as suggested by the device form factor), to thereby image a physical environment in a similar pattern to the illumination provided by a handheld flashlight. Alternatively, the camera may be remotely located from the HMD device and the peripheral control device. In at least some implementations, multiple cameras located on-board the HMD device, on-board the peripheral control device, and/or at a remote location may be used to capture respective videos or other imagery from the multiple cameras, which can be selectively displayed on an individual basis or combined (e.g., stitched together) to form a composite video or imagery. The one or more cameras may take the form of a wide-angle camera that captures video and/or static images in one or more of color, black and white, infrared, and/or other spectral range.

In at least some implementations, a real-world viewing mode that enables a user to view a portion of the real-world scene via the display device may be user-selectable. Engagement and disengagement of the real-world viewing mode may be responsive to user input received via a user input interface. Where the real-world viewing mode is user-selectable, at 216, the method includes determining whether the real-world viewing mode is engaged or disengaged. For example, at 218, the method includes receiving the user input via the user input interface. The user input interface may be located on-board the peripheral control device or the HMD device, for example, and may take various forms include a physical user input interface (e.g., a button), a natural language interface (e.g., microphone and speech recognition), etc.

At 220, the method includes displaying a real-world portal via the display device. The real-world portal includes a portion of the real-world scene and simulates a view through the virtual reality scene at a position within the display region that tracks the real-world positioning of the peripheral control device. In an example, the real-world portal is displayed by overlaying the real-world portal upon the virtual scene in a manner that fully obscures or replaces the underlying portion of the virtual scene. Alternatively, visual elements of both the real-world portal and the underlying portion of the virtual scene may co-exist (e.g., be blended) on the display, with the underlying portion of the virtual scene optionally being displayed in simplified form (e.g., wireframe). Typically, the portion of the real-world scene included in the real-world portal is displayed at an apparent real-world scale, thereby enabling the user to naturally perceive and/or interact with the physical environment. In this example, displaying the real-world portal at 220 is performed while the real-world viewing mode is engaged. Where the real-world viewing mode is user-selectable, at 222, the method includes discontinuing displaying the real-world portal via the display device while the real-world viewing mode is disengaged.

In at least some implementations, the position of the real-world portal within the display region tracks the real-world positioning of the peripheral control device by presenting the real-world portal at an apparent positioning of a virtual viewing window that is spaced away from and spatially locked to the real-world positioning of the peripheral control device. The portion of the real-world scene may be a limited field of view of the camera that is less than an entire field of view of the camera. The limited field of view may be defined by a virtual viewing window that is spaced away from and spatially locked to the real-world positioning of the peripheral control device. As an example, the virtual viewing window is a section of a cone that represents an aiming projection of the peripheral control device. The virtual viewing window may be spaced away from the peripheral control device by a pre-defined distance in physical space. This pre-defined distance may be user-defined, defined by an application program, defined by an operating system, or by a combination thereof. Non-limiting example of operation within the real-world viewing mode is described in further detail with reference to FIGS. 3B-3K.

Within the context of an operating system and application program ecosystem, displaying the real-world portal may be performed by the operating system of a computing device after the application program provides the virtual scene to the operating system for display. The real-world portal may be overlaid upon the provided virtual scene at a position determined by the operating system. Alternatively, the application program may direct the operating system to display the real-world portal at a particular position. The peripheral control device may include user input interfaces that are dedicated to the operating system and other user input interfaces that are dedicated to the application program, enabling the real-world viewing mode to be selectively engaged or disengaged at the operating system or application program level, depending on implementation. Alternatively, the peripheral control device may include shared user input interfaces that selectively can be used by both the operating system and one or more applications.

In at least some implementations, a view-lock mode may be supported that locks a real-world positioning of the virtual viewing window relative to the physical environment to thereby lock the portion of the real-world scene to a physical point in space (e.g., so that the portal always provides a view of a beer on a table when the user's head looks towards the beer). Engagement and disengagement of the view-lock mode may be user-selectable and may be responsive to user input received via a user input interface. Where the view-lock mode is user-selectable, at 224, the method includes determining whether the view-lock mode is engaged or disengaged. For example, at 226, the method includes receiving a user input via a user input interface. As previously described, the user input interface may be located on-board the peripheral control device, for example.

At 228, the method includes locking a real-world positioning of the virtual viewing window relative to the physical environment in which the virtual viewing window is no longer spatially locked to the real-world positioning of the peripheral control device, and the real-world portal no longer tracks the real-world positioning of the peripheral control device. In this example, locking a real-world positioning of the virtual viewing window relative to the physical environment at 228 is performed while the view-lock mode is engaged. A non-limiting example of operation within the view-lock mode is described in further detail with reference to FIGS. 3F and 3G. Where the view-lock mode is user-selectable, at 230, the method includes discontinuing locking a real-world positioning of the virtual viewing window relative to the physical environment while the view-lock mode is disengaged.

In some implementations, a user may utilize the real-world viewing mode to aim the portal at a desired object (e.g., a light switch, a keyboard, a beer), and then switch to the view-lock mode so that the desired objects will always be visible to the user. In some implementations, the user may mark more than one view-lock region, so that different portals may be used to see different real-world objects. In such cases, if the real-world objects are physically close to one another, plural portals may be simultaneously displayed.

In at least some implementations, a portal-lock mode may be supported that locks the position at which the real-world portal is displayed within the display region in which the position within the display region no longer tracks the real-world positioning of the peripheral control device. Engagement and disengagement of the portal-lock mode may be user-selectable and may be responsive to user input received via a user input interface. Where the portal-lock mode is user-selectable, at 232, the method includes determining whether the portal-lock mode is engaged or disengaged. For example, at 234, the method includes receiving a user input via a user input interface. As previously described, the user input interface may be located on-board the peripheral control device, for example.

At 236, the method includes locking the position at which the real-world portal is displayed within the display region. After such locking, the position of the portal within the display region no longer tracks the real-world positioning of the peripheral control device. In this example, locking the position at which the real-world portal is displayed at 236 is performed while the portal-lock mode is engaged. A non-limiting example of operation within the portal-lock mode is described in further detail with reference to FIGS. 3H-3K.

Within the context of an HMD device, while operating in the portal-lock mode of operation, a portal may be locked in a specific region of the display (e.g., a top right corner). Then, a user may move his or her head to change the portion of the real-world view that is presented within the locked real-world portal. This head-based control of the real-world view may be referred to as a headlight mode of operation. Alternatively or additionally, the aiming projection of the peripheral control device may be used to change the portion of the real-world scene that is displayed in the portal. For example, the portal can be locked to a top right corner of the display, and then the peripheral control device may be aimed towards different objects which are then shown in the locked portal. This peripheral-based control of the real-world view may be referred to as an active aiming mode of operation. The headlight mode and active aiming modes of operation may be user-selectable responsive to user input received via a user input interface, for example. Where the portal-lock mode is user-selectable, at 238, the method includes discontinuing locking the position of the real-world portal within the display region to once again track the positioning of the peripheral control device while the view-lock mode is disengaged.

In some implementations, a user may utilize the real-world viewing mode to move the portal to a desired location on the display (e.g., a top left corner, a bottom right corner, a middle left location), and then switch to the portal-lock mode so that the portal sticks at that display location. In some implementations, the user may place more than one portals at different display locations, so that different portals may simultaneously provide different views to the real world.

In implementations where a user engages with two peripheral control devices, such as left and right-handheld controllers, aspects of method 200 may be extended to include display of two real-world portals that correspond to each of the two peripheral control devices, thereby enabling independent control of the real-world views displayed to the user. For example, each peripheral may be operated in the same or different mode of operation (e.g., flashlight mode, view-lock mode, portal-lock mode, etc.).

Figure 3A:
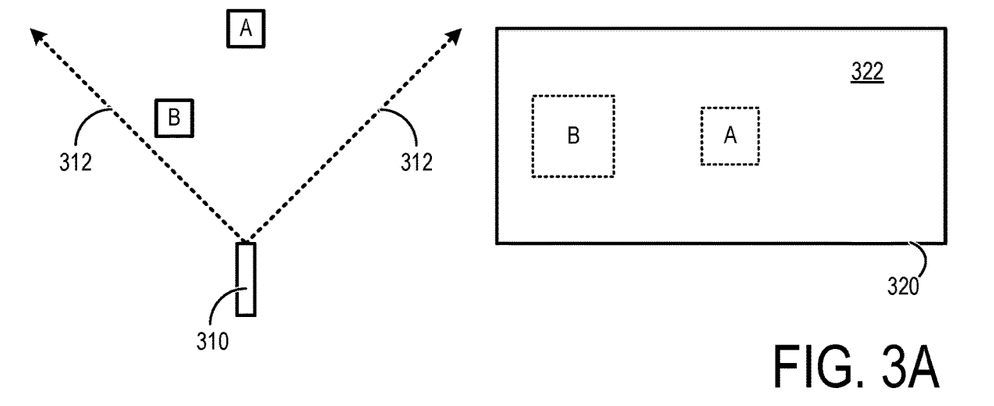
FIGS. 3A-3K schematically depict examples in which a camera and/or a peripheral control device are operated within a physical environment containing physical objects.

FIG. 3A depicts an example in which a camera 310 has a conical field of view (FOV) that is bounded by rays 312. This conical FOV may be referred to as FOV 312, and represents the maximum FOV of camera 310. Objects A and B are located within the FOV 312 of camera 310. As an example, camera 310 may be an outward facing camera of an HMD device that approximates a perspective of a user wearing the HMD device. An example display region 320 of a display device, such as an occluding, near-eye HMD device, is also depicted alongside the FOV of camera 310. Objects A and B of identical size and shape are depicted with broken lines in FIG. 3A to represent their relative locations behind display region 320. A virtual reality scene 322 may be displayed within display region 320 of the display device.

When the virtual reality scene 322 is displayed without a real-world viewing mode engaged, the user cannot see either of objects A or B.

Figure 3B:
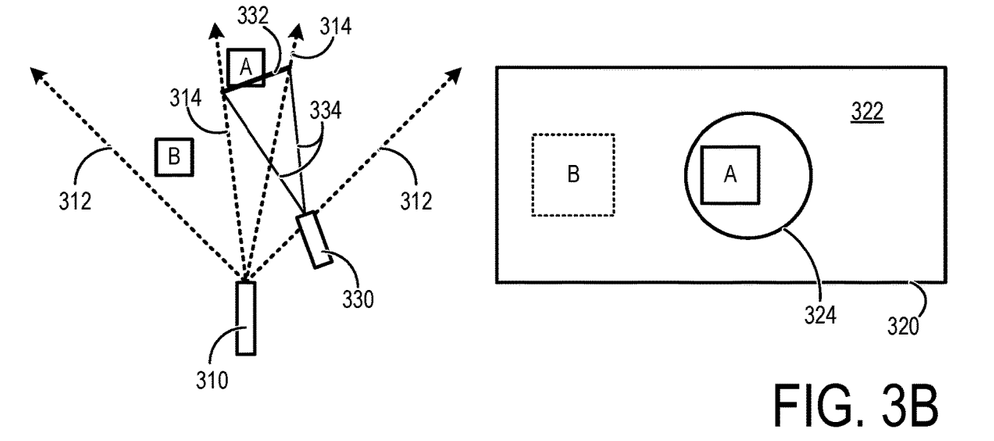

FIG. 3B depicts an example in which camera 310 again has a conical FOV that is bounded by rays 312. For purposes of comparison, a relative positioning of camera 310 and objects A and B is the same as the preceding example of FIG. 3A. A peripheral control device 330 is depicted in FIG. 3B as having a real-world positioning relative to camera 310. A virtual viewing window 332 is also depicted in FIG. 3B that is spaced away from and spatially locked to peripheral control device 330. Virtual viewing window 332 may take the form of a section of an aiming projection of peripheral control device 330. For example, virtual viewing window 332 may take the form of a section of a conical aiming projection that is orthogonally facing to peripheral control device 330 at a pre-defined physical distance away from the peripheral control device. The aiming projection in FIG. 3B is bounded by rays 334, and may be referred to as aiming projection 334.

A limited FOV of camera 310 bounded by rays 314 is also depicted in FIG. 3B, and may be referred to as limited FOV 314. Limited FOV 314 represents a portion of the camera's entire FOV 312, and is defined by its intersection with rays 334 representing the aiming projection of the peripheral control device. Hence, in this example, limited FOV 314 of camera 310 is defined with respect to virtual viewing window 332 of the peripheral control device.

FIG. 3B further depicts display region 320 as displaying a real-world portal 324. Real-world portal 324 includes at least a portion of a real-world scene captured by the camera and simulates a view through virtual reality scene 322. For example, real-world portal 324 includes a portion of the camera's entire FOV represented by limited FOV 314. Object A captured via camera 310 is included within real-world portal 324 because object A is within limited FOV 314 of the camera. While object B is captured within the camera's entire FOV 312, object B is not captured within limited FOV 314. Therefore, object B is not included within real-world portal 324 in this example, and is instead depicted with broken lines.

Real-world portal 324 has a circular shape in the example depicted in FIG. 3B. However, a portal may have different sizes and/or shapes. The camera-captured view through portal 324 is scaled so that the apparent size of block A is substantially equal to the actual size block A would have if viewed directly by the user with the user's own eyes. The camera-captured view through portal 324 is positioned within display region 320 so that the apparent position of block A is substantially equal to the actual position block A would have if viewed directly by the user with the user's own eyes. The image from the camera can be cropped, scaled, skewed, and/or distorted in any way necessary to 1) substantially match the apparent size to the real-world size, and 2) substantially match the apparent position to the real-world position. Further, the size and shape of the portal on the display may be changed to provide a larger or smaller view into the real world.

Figure 3C:
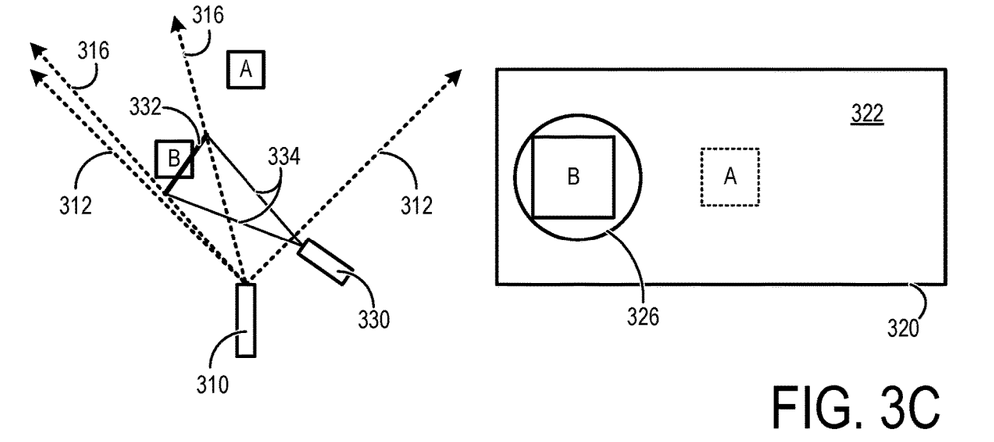

FIG. 3C depicts an example in which a positioning of peripheral control device 330 relative to camera 310 has been changed from the preceding example of FIG. 3B, thereby causing virtual viewing window 332 to move in relation to the camera's FOV 312. In this example, the user is again operating in the real-world viewing mode (e.g., at 220 of FIG. 2). For purposes of comparison, a relative positioning of camera 310 and objects A and B is the same as the preceding examples of FIGS. 3A and 3B. Due to a change in a positioning of peripheral control device 330 relative to camera 310 and objects A and B, a different limited FOV bounded by rays 316 is thereby provided, and may be referred to as limited FOV 316. Limited FOV 316 again represents a portion of the camera's entire FOV 312, and is defined by its intersection with rays 334 representing the aiming projection of the peripheral control device. Hence, in this example, limited FOV 316 of camera 310 is defined with respect to the changed positioning of virtual viewing window 332.

FIG. 3C further depicts display region 320 as displaying a real-world portal 326. Real-world portal 326 similarly includes at least a portion of a real-world scene captured by the camera and simulates a view through virtual reality scene 322. In this example, real-world portal 326 includes a portion of the camera's entire FOV represented by limited FOV 316. Object B captured via camera 310 is displayed within real-world portal 326 because object B is within limited FOV 316 of the camera. While object A is captured within the camera's entire FOV 312, object A is not captured within limited FOV 316. Therefore, object A is not displayed within real-world portal 326 in this example, and is instead depicted with broken lines (i.e., virtual reality scene 322 occludes object A).

The ability for a user to change a real-world positioning of a peripheral control device relative to a display device to change the content and position of a real-world portal may be referred to as a flashlight mode of operation. Like a flashlight illuminating a darkened room, the peripheral control device casts an aiming projection that defines which portion of the real-world scene is displayed to the user as depicted in FIGS. 3B and 3C, for example.

Figure 3D:
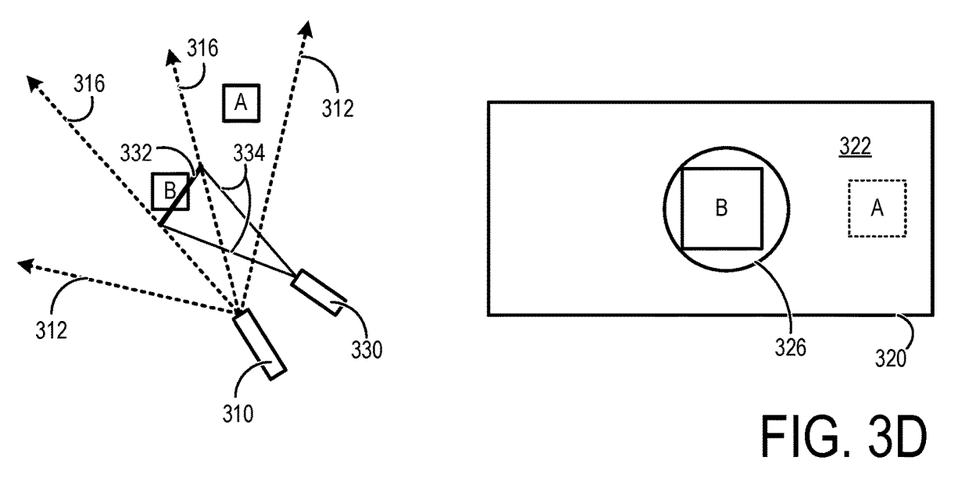

FIG. 3D depicts an example in which a positioning of camera 310 relative to the physical environment has changed while the positioning of peripheral control device 330 has remained the same. In this example, the user is again operating in the real-world viewing mode (e.g., at 220 of FIG. 2). FIG. 3D depicts display region 320 being updated to reflect a changed position of real-world portal 326 within the display region, while also maintaining object B within the real-world portal.

Figure 3E:
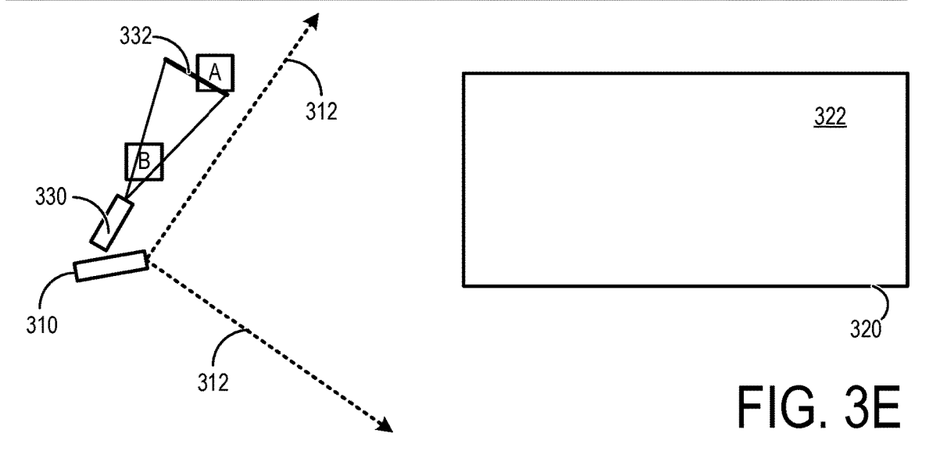

FIG. 3E depicts an example in which the entire FOV 312 of camera 310 does not capture either of virtual viewing window 332 or objects A or B. Accordingly, display region 320 does not contain a real-world portal.

Figure 3F:
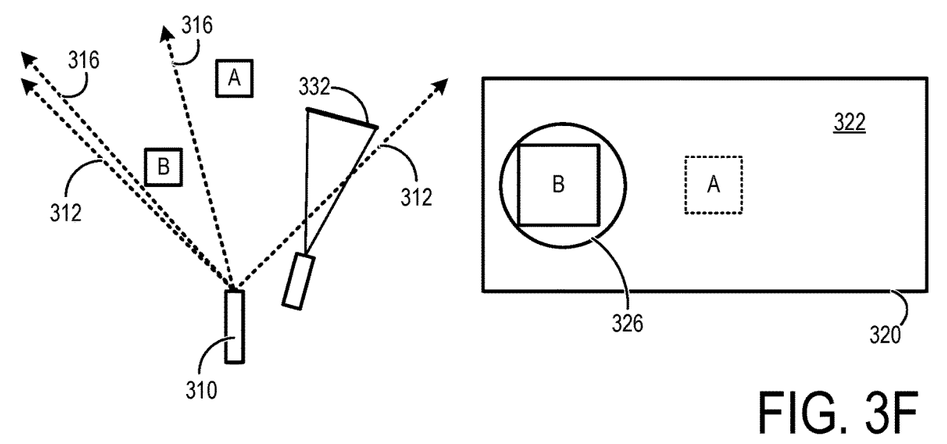

FIG. 3F depicts an example of the view-lock mode as described herein. In FIG. 3F, virtual viewing window 332 depicted in FIG. 3C has been locked relative to the physical environment, enabling the peripheral control device to be moved to a different position without changing the relative positioning of the virtual viewing window or of limited FOV 316. Accordingly, object B remains within real-world portal 326 in the example of FIG. 3F even though a positioning of the peripheral control device has changed. For example, the user may be initially operating in the real-world viewing mode (e.g., at 220 of FIG. 2) to aim the real-world portal at object B in FIG. 3C, and then the user may engage the view lock mode (e.g., at 228 of FIG. 2) to maintain object B within the real-world portal even if the peripheral control device is aimed elsewhere, as depicted in FIG. 3F. The view-lock mode enables a user to continue to monitor a physical point/region/object in space without maintaining a constant positioning of the peripheral control device.

Figure 3G:
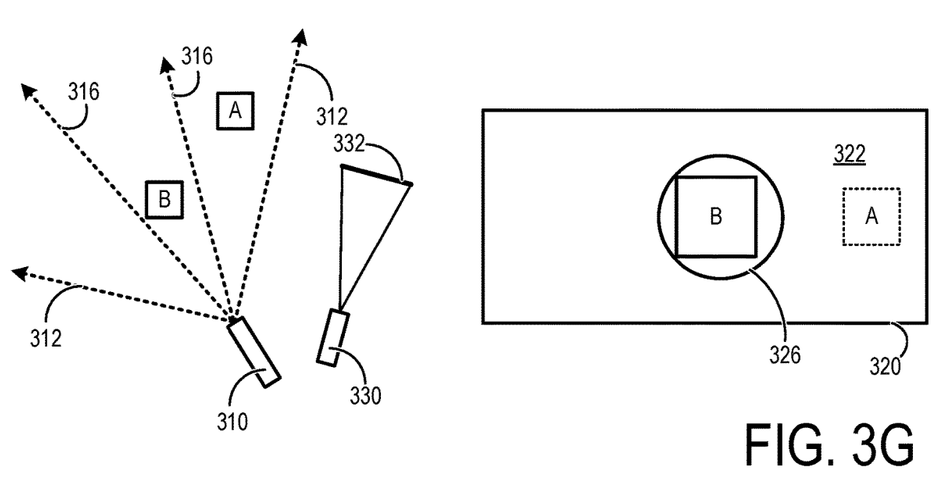

FIG. 3G depicts another example of the view-lock mode in which camera 310 is repositioned from the position depicted in FIG. 3F. In FIG. 3G, camera 310 is rotated to the left in relation to FIG. 3F, which causes the position of real-world portal 326 and object B displayed therein to move to the right within the display region 320. Here, the real-world scene that includes object B remains within the real-world portal even though the peripheral control device is no longer aimed at object B.

Figure 3H:
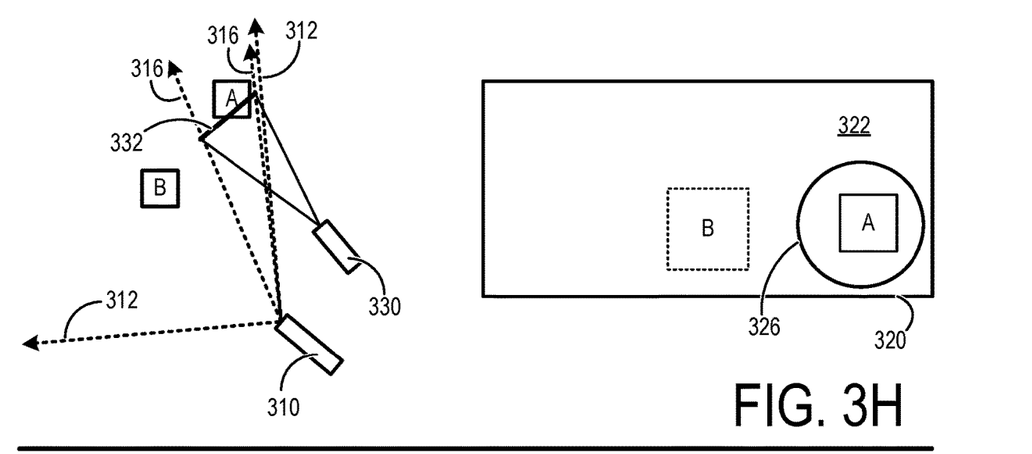

FIG. 3H-3K depict examples in which the portal-lock mode is used. In FIG. 3H, a user initially uses the flashlight mode to move the portal to the lower right corner of the display, where object A is located. The user aims peripheral control device 330 so that the portal is positioned at the lower right corner of the display, which causes a portion of a real-world scene corresponding to limited FOV 316 that contains object A to be displayed within real-world portal 326.

Figure 3I:
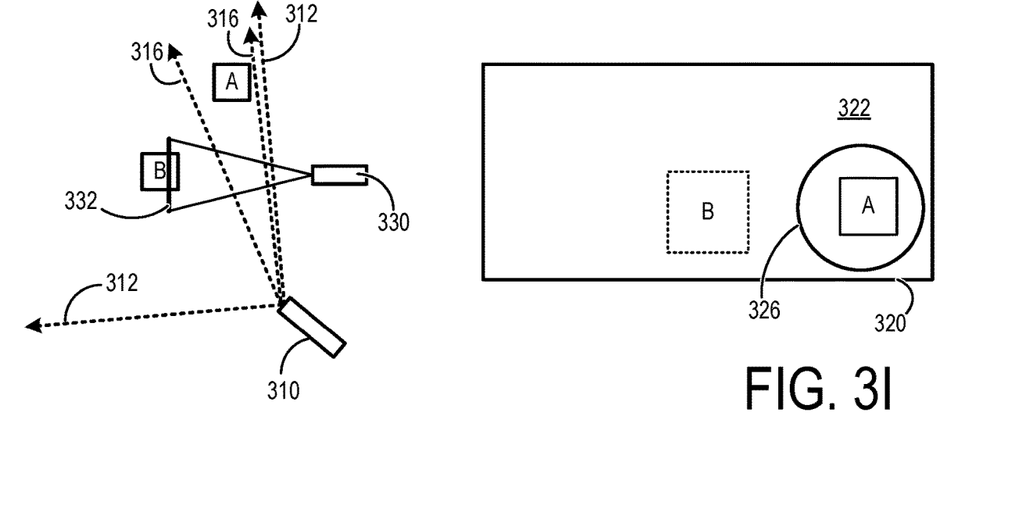

While aiming peripheral control device 330 at object A, the user engages the portal-lock mode to lock real-world portal 326 within display region 320 at the position depicted in FIG. 3H. For example, the user may engage the portal lock mode as previously described with reference to operations 232, 234, and 236 of FIG. 2. While the portal-lock mode is engaged, the user moves peripheral control device 330 from the position depicted in FIG. 3H to the position depicted in FIG. 3I. In FIG. 3I peripheral control device 330 is no longer aimed at object A. However, the position of real-world portal 326 does not change in FIG. 3I from its locked position depicted in FIG. 3H.

While operating in the portal-lock mode, if the headlight mode is also engaged, the positioning of the peripheral control device no longer defines which portion of the real-world scene is displayed within the real-world portal. Rather, the positioning of the camera determines which portion of the real-world scene is displayed within the real-world portal. In headlight mode, the limited FOV is locked relative to the camera. For example, the portion of the real-world scene corresponding to limited FOV 316 that contains object A in FIG. 3I continues to be displayed in FIG. 3I even though peripheral control device 330 is no longer aimed at object A. In FIGS. 3H and 3I, the positioning of camera 310 remains constant. Therefore, object A continues to be displayed in real-world portal 326 in both FIGS. 3H and 3I, because limited FOV 316 has not changed.

Figure 3J:
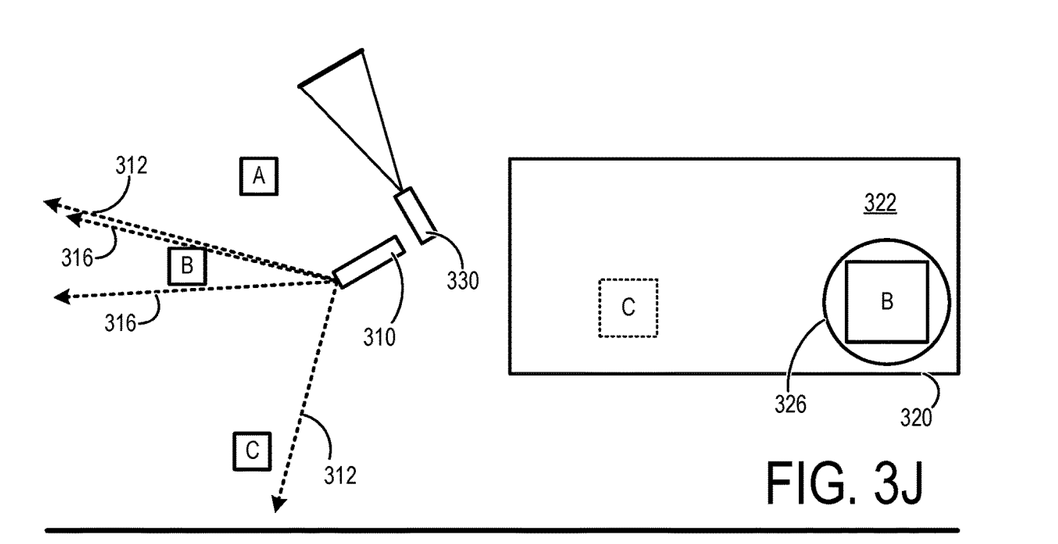

FIG. 3J depicts an example in which camera 310 is repositioned relative to FIGS. 3H and 3I such that object A is no longer within limited FOV 316. While portal-lock mode is engaged, real-world portal 326 remains locked to the same position of display region 320 as depicted in FIGS. 3H and 3I even though both camera 310 and peripheral control device 330 have been repositioned. Furthermore, while headlight mode is engaged, the portion of the real-world scene that is displayed in the locked real-world portal tracks limited FOV 316. For example, camera 310 is repositioned in FIG. 3J so that object B is within limited FOV 316 while headlight mode is engaged. Accordingly, the portion of the real-world scene that contains object B is displayed within real-world portal 326 in FIG. 3J, rather than object A as previously depicted in FIGS. 3H and 3I.

Figure 3K:
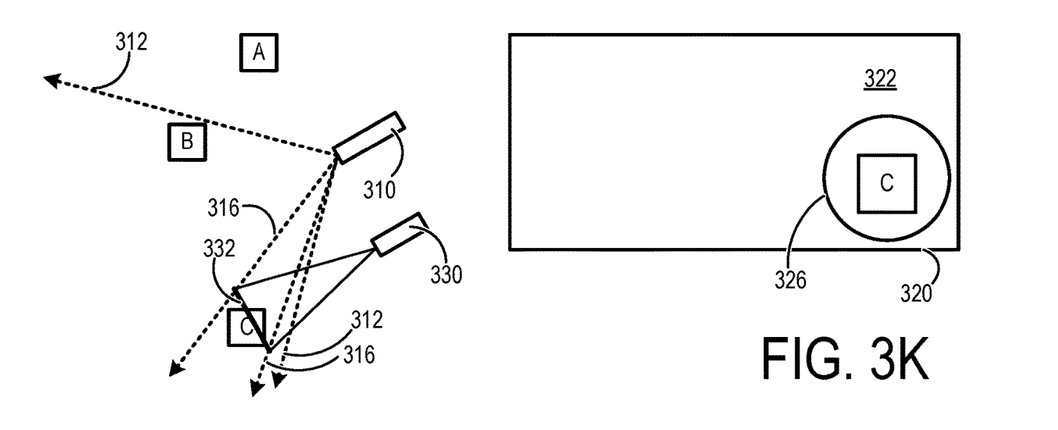

FIG. 3K depicts an example in which camera 310 is again repositioned relative to FIG. 3J while operating in portal-lock mode. However, in contrast to the previous examples of FIGS. 3I and 3J in which peripheral control device 330 does not determine the portion of the real-world scene that is displayed in the real-world portal, in FIG. 3J an active aiming mode is engaged rather than the headlight mode. The active aiming mode enables the user to once again use the peripheral control device to define the portion of the real-world scene that is displayed in the real-world portal. For example, in FIG. 3J, the user has aimed peripheral control device 330 at an object C. Accordingly, the portion of the real-world scene that contains object C is displayed within real-world portal 326. In FIG. 3K, real-world portal 326 remains locked to the same position within the display region 320 as previously depicted in FIGS. 3H, 3L, and 3J even though peripheral control device 330 has been repositioned. In this way, a portal positioned at the lower right portion of the display provides a view of the far-left portion of the cameras FOV. The active aiming mode is similar to the previously described flashlight mode, but is instead used within the context of the portal-lock mode to define the real-world scene that is displayed within the locked portal.

In at least some implementations, the methods and processes described herein may be tied to a computing system that includes one or more computing devices. In particular, such methods and processes may be implemented as computer-based instructions and/or data including an operating system, application program, service, application-programming interface (API), library, and/or other computer-program product.

Figure 4:
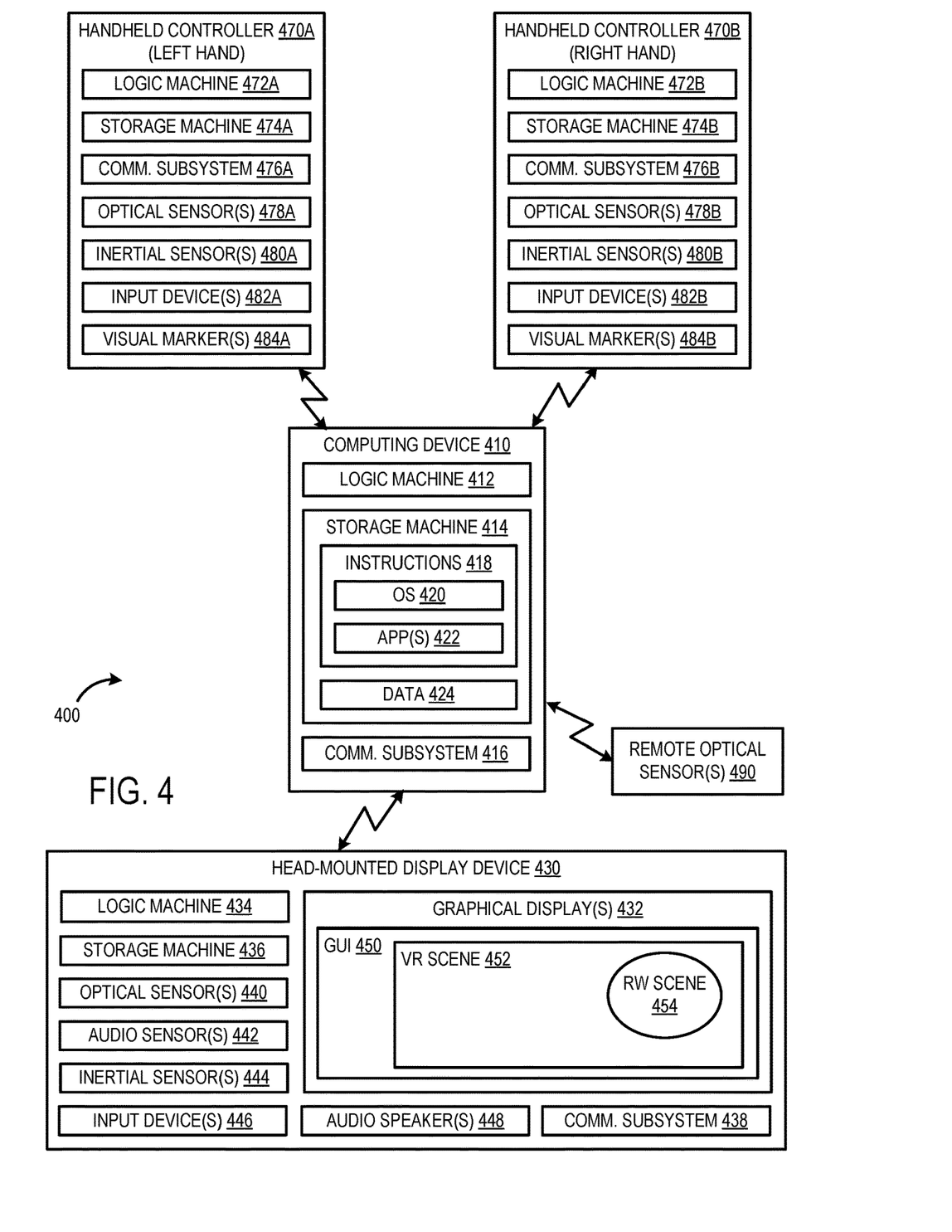
FIG. 4 is a schematic diagram depicting an example computing system.

FIG. 4 schematically shows an example of a computing system 400 that can enact one or more of the methods and processes described herein. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), display devices (e.g., HMD device), peripheral control devices, wearable devices, and/or other computing devices. Computing system 400 may be referred to as a virtual reality system within the context of the present disclosure.

Computing system 400 includes one or more computing devices of which computing device 410 is a non-limiting example. Computing device 410 includes a logic machine 412, a storage machine 414, and a communication subsystem 416. Computing device 410 may optionally include a display subsystem, an input subsystem, and/or other components not shown in FIG. 4.

Logic machine 412 includes one or more physical devices configured to execute instructions. For example, a logic machine may be configured to execute instructions that are part of one or more operating systems, applications, services, programs, routines, libraries, objects, components, data structures, or other logical constructs. Such instructions may be implemented to perform a task, implement a data type, transform the state of one or more components, achieve a technical effect, or otherwise arrive at a desired result. For example, instructions 418 held in storage machine 414 may include an operating system 420, one or more application programs 422, and/or data 424.

A logic machine may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Storage machine 414 includes one or more physical devices configured to hold instructions 418 and/or data 424. Instructions 418 may be executable by logic machine 412 to implement the methods and processes described herein. When such methods and processes are implemented, the state of storage machine 414 may be transformed—e.g., to hold different data.

A storage machine may include removable and/or built-in devices. A storage machine may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A storage machine may include volatile, nonvolatile, dynamic, static, read/write, read-only, random-access, sequential-access, location-addressable, file-addressable, and/or content-addressable devices.

It will be appreciated that a storage machine includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 412 and storage machine 414 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 412 executing instructions 418 held by storage machine 414. It will be understood that different modules, programs, and/or engines may be instantiated from the same operating system, application, service, code block, object, library, routine, API, function, etc. Likewise, the same module, program, and/or engine may be instantiated by different operating systems, applications, services, code blocks, objects, routines, APIs, functions, etc. The terms "module," "program," and"engine" may encompass individual or groups of executable files, data files, libraries, drivers, scripts, database records, etc.

It will be appreciated that a "service", as may be used herein, is an application program executable across multiple user sessions. A service may be available to one or more system components, programs, and/or other services. In some implementations, a service may run on one or more server-computing devices.

Computing system may include one or more peripheral devices such as an HMD device 430 and handheld controllers 470A and 470B. These peripheral devices may themselves take the form of a computing device. HMD device 430 includes one or more graphical displays 432, and is a non-limiting example of a display device. For example, HMD device 430 may include independent right and left-eye graphical displays. It will be understood that a display device may take other forms, such as a mobile handheld or tablet display device, for example. Graphical displays 432 forming one or more display regions may be used to present a graphical user interface (GUI) 450, which may include a virtual reality scene and a real-world scene, for example.

HMD device 430 may additionally include a logic machine 434, a storage machine 436, a communication subsystem 438, one or more optical sensors 440 (e.g., cameras), one or more audio sensors 442 (e.g., microphones), one or more inertial sensors 444 (e.g., accelerometers, gyroscopes, tilt sensors, etc.), one or more other input devices 446 (e.g., buttons, touch-sensitive surfaces, etc.), and one or more audio speakers 448. Optical sensors 440 of HMD device 430 may include one or more outward facing cameras that approximate a perspective of a person wearing the HMD device, such as previously described with reference to FIGS. 1-3. The various sensors of HMD device 430 and/or other input devices 446 may provide a user interface by which a user selects a mode of operation, as described herein.

Handheld controllers 470A and 470B are non-limiting examples of peripheral control devices, as described herein. For example, handheld controller 470A may correspond to a controller for a left hand and handheld controller 470B may correspond to a controller for a right hand of a user. Handheld controllers 470A and 470B may each additionally include logic machines 472A and 472B, storage machines 474A and 474B, communication subsystems 476A and 476B, one or more optical sensors 478A and 478B (e.g., cameras), one or more inertial sensors 480A and 480B (e.g., accelerometers, gyroscopes, tilt sensors, etc.), one or more other input devices 482A and 482B (e.g., buttons, touch-sensitive surfaces, joystick, etc.), and one or more visual markers 484A and 484B. Visual markers 484A and 484B may be configured in a constellation pattern that enables a positioning of handheld controllers 470A and 470B to be determined from images captured via a camera, such as an outward facing camera of HMD device 430 or other remote optical sensors 490.

When included, a display device may be used to present a visual representation of data held by a storage machine. This visual representation may take the form of a graphical user interface (GUI). As the herein described methods and processes change the data held by the storage machine, and thus transform the state of the storage machine, the state of display device may likewise be transformed to visually represent changes in the underlying data. A display device may be combined with a logic machine and/or storage machine in a shared enclosure, or such display devices may be peripheral display devices.

When included, an input interface may utilize one or more user-input devices such as a keyboard, mouse, touch screen, handheld controller, HMD device, etc. In at least some implementations, an input interface may utilize natural user input (NUI) componentry. Such componentry may be integrated or peripheral, and the transduction and/or processing of input actions may be handled on or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, a communication subsystem may be configured to communicatively couple a computing device or peripheral device with one or more other computing devices or peripheral devices. For example, computing device 410, HMD device 430, handheld controllers 470A and 470B, and remote optical sensors 490 may communicate with each other via their respective communication subsystem over a wired or wireless link. Accordingly, a communication subsystem may include wired and/or wireless communication devices compatible with one or more communication protocols. As non-limiting examples, a communication subsystem may be configured for communication via a wireless and/or wired local or wide area network. In some embodiments, the communication subsystem may allow computing system 400 to send and/or receive messages to and/or from other devices via a network such as the Internet.

FIG. 4 schematically depicts a non-limiting example in which computing device 410 communicates with HMD device 430, handheld controllers 470A and 470B, and remote optical sensors 490. For example, communications between HMD device 430 and handheld controllers 470A and 470B may traverse computing device 410. It is to be understood that one or more of these devices may communicate with each other directly or via another device. For example, handheld controllers 470A and 470B may communicate with computing device 410 via HMD device 430. In this example, communications between computing device 410 and handheld controllers 470A and 470B may traverse HMD device 430.

In an example of the present disclosure, a method comprises: displaying a virtual reality scene via a display device; identifying a real-world positioning of a peripheral control device relative to the display device; capturing video of a real-world scene of a physical environment located behind a display region of the display device via a camera; and displaying a real-world portal via the display device in which the real-world portal includes a portion of the real-world scene and simulates a view through the virtual reality scene at a position within the display region that tracks the real-world positioning of the peripheral control device. In this example or any other example of the present disclosure, the portion of the real-world scene is a limited field of view of the camera that is less than an entire field of view of the camera; and the limited field of view is defined by a virtual viewing window that is spaced away from and spatially locked to the real-world positioning of the peripheral control device. In this example or any other example of the present disclosure, the virtual viewing window is a section of a cone that represents a virtual field of view of the peripheral control device. In this example or any other example of the present disclosure, the virtual viewing window is spaced away from the peripheral control device by a pre-defined distance in physical space. In this example or any other example of the present disclosure, the method further comprises locking a real-world positioning of the virtual viewing window relative to the physical environment responsive to engagement of a view-lock mode in which the virtual viewing window is no longer spatially locked to the real-world positioning of the peripheral control device. In this example or any other example of the present disclosure, the method further comprises locking the position at which the real-world portal is displayed within the display region responsive to engagement of a portal-lock mode in which the position within the display region no longer tracks the real-world positioning of the peripheral control device. In this example or any other example of the present disclosure, an application provides the virtual reality scene for display, and the real-world portal is displayed as an overlay to the virtual reality scene provided by the application. In this example or any other example of the present disclosure, the display device is a head-mounted display device. In this example or any other example of the present disclosure, the head-mounted display device is a near-eye head-mounted display device that occludes a user's view of the physical environment. In this example or any other example of the present disclosure, the camera is an outward facing camera of the head-mounted display device that approximates a perspective of a user wearing the head-mounted display device. In this example or any other example of the present disclosure, the peripheral control device is a handheld controller. In this example or any other example of the present disclosure, the method further comprises: receiving a user input via a user interface of the peripheral control device; and responsive to the user input, engaging or disengaging a real-world viewing mode, wherein: while the real-world viewing mode is engaged, the real-world portal is displayed via the display device, and while the real-world viewing mode is disengaged, the real-world portal is not displayed via the display device. In this example or any other example of the present disclosure, the portion of the real-world scene included in the real-world portal is displayed at an apparent real-world scale.

In another example of the present disclosure, a virtual reality system comprises a computing system configured to: display a virtual reality scene via a display device; identify a real-world positioning of a peripheral control device relative to the display device; capture video of a real-world scene of a physical environment located behind a display region of the display device via a camera; and display a real-world portal via the display device in which the real-world portal includes a portion of the real-world scene and simulates a view through the virtual reality scene at a position within the display region that tracks the real-world positioning of the peripheral control device. In this example or any other example of the present disclosure, the display device is a head mounted display device; the camera is an outward facing camera of the head-mounted display device; and the peripheral control device is a handheld controller. In this example or any other example of the present disclosure, the computing system is further configured to: receive a user input via a user interface of the peripheral control device; and responsive to the user input, engage or disengage a real-world viewing mode, wherein: while the real-world viewing mode is engaged, the real-world portal is displayed via the display device, and while the real-world viewing mode is disengaged, the real-world portal is not displayed via the display device. In this example or any other example of the present disclosure, the portion of the real-world scene is a limited field of view of the camera that is less than an entire field of view of the camera; and the limited field of view is defined by a virtual viewing window that is spaced away from and spatially locked to the real-world positioning of the peripheral control device. In this example or any other example of the present disclosure, the computing system is further configured to: receive a user input via a user interface of the peripheral control device; and responsive to the user input, lock a real-world positioning of the virtual viewing window relative to the physical environment such that the virtual viewing window is no longer spatially locked to the real-world positioning of the peripheral control device. In this example or any other example of the present disclosure, the computing system is further configured to: receive a user input via a user interface of the peripheral control device; and responsive to the user input, lock the position at which the real-world portal is displayed within the display region such that the position within the display region no longer tracks the real-world positioning of the peripheral control device.

In another example of the present disclosure, a storage machine is disclosed holding instructions executable by a logic machine to: display a virtual reality scene via a display device; identify a real-world positioning of a peripheral control device relative to the display device; capture video of a real-world scene of a physical environment located behind a display region of the display device via a camera; and display a real-world portal via the display device, the real-world portal including a portion of the real-world scene and simulating a view through the virtual reality scene at a position within the display region that tracks the real-world positioning of the peripheral control device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
   displaying a virtual reality scene via a display device;
   identifying a real-world positioning of a peripheral control device relative to the display device;
   capturing video of a real-world scene of a physical environment located behind a display region of the display device via a camera; and
   displaying a real-world portal via the display device, the real-world portal including a portion of the real-world scene and simulating a view through the virtual reality scene at a position within the display region,
   wherein the position of the real-world portal within the display region tracks a section of a virtual field of view of the peripheral control device that is spaced away from and spatially locked to the real-world positioning of the peripheral control device.

2. The method of claim 1, wherein the portion of the real-world scene is a limited field of view of the camera that is less than an entire field of view of the camera; and
   wherein the limited field of view is defined by a virtual viewing window corresponding to the section that is spaced away from and spatially locked to the real-world positioning of the peripheral control device.

3. The method of claim 2, wherein the section is a section of a cone that represents the virtual field of view of the peripheral control device.

4. The method of claim 2, wherein the virtual viewing window is spaced away from the peripheral control device by a pre-defined distance in physical space.

5. The method of claim 2, further comprising:
   locking a real-world positioning of the virtual viewing window relative to the physical environment responsive to engagement of a view-lock mode in which the virtual viewing window is no longer spatially locked to the real-world positioning of the peripheral control device.

6. The method of claim 2, further comprising:
   locking the position at which the real-world portal is displayed within the display region responsive to engagement of a portal-lock mode in which the position within the display region no longer tracks the real-world positioning of the peripheral control device.

7. The method of claim 1, wherein an application provides the virtual reality scene for display, and wherein the real-world portal is displayed as an overlay to the virtual reality scene provided by the application.

8. The method of claim 1, wherein the display device is a head-mounted display device.

9. The method of claim 8, wherein the head-mounted display device is a near-eye head-mounted display device that occludes a user's view of the physical environment.

10. The method of claim 8, wherein the camera is an outward facing camera of the head-mounted display device that approximates a perspective of a user wearing the head-mounted display device.

11. The method of claim 1, wherein the peripheral control device is a handheld controller.

12. The method of claim 1, further comprising:
receiving a user input via a user interface of the peripheral control device; and
responsive to the user input, engaging or disengaging a real-world viewing mode, wherein:
while the real-world viewing mode is engaged, the real-world portal is displayed via the display device, and
while the real-world viewing mode is disengaged, the real-world portal is not displayed via the display device.

13. The method of claim 1, wherein the portion of the real-world scene included in the real-world portal is displayed at an apparent real-world scale.

14. A virtual reality system, comprising:
a computing system configured to:
display a virtual reality scene via a display device;
identify a real-world positioning of a peripheral control device relative to the display device;
capture video of a real-world scene of a physical environment located behind a display region of the display device via a camera; and
display a real-world portal via the display device, the real-world portal including a portion of the real-world scene and simulating a view through the virtual reality scene at a position within the display region,
wherein the position of the real-world portal within the display region tracks a section of a virtual field of view of the peripheral control device that is spaced away and spatially locked to the real-world positioning of the peripheral control device.

15. The virtual reality system of claim 14, wherein the display device is a head mounted display device;
wherein the camera is an outward facing camera of the head-mounted display device; and
wherein the peripheral control device is a handheld controller.

16. The virtual reality system of claim 14, wherein the computing system is further configured to:
receive a user input via a user interface of the peripheral control device; and
responsive to the user input, engage or disengage a real-world viewing mode, wherein:
while the real-world viewing mode is engaged, the real-world portal is displayed via the display device, and
while the real-world viewing mode is disengaged, the real-world portal is not displayed via the display device.

17. The virtual reality system of claim 14, wherein the portion of the real-world scene is a limited field of view of the camera that is less than an entire field of view of the camera; and
wherein the limited field of view is defined by a virtual viewing window corresponding to the section that is spaced away from and spatially locked to the real-world positioning of the peripheral control device.

18. The virtual reality system of claim 17, wherein the computing system is further configured to:
receive a user input via a user interface of the peripheral control device; and
responsive to the user input, lock a real-world positioning of the virtual viewing window relative to the physical environment such that the virtual viewing window is no longer spatially locked to the real-world positioning of the peripheral control device.

19. The virtual reality system of claim 14, wherein the computing system is further configured to:
receive a user input via a user interface of the peripheral control device; and
responsive to the user input, lock the position at which the real-world portal is displayed within the display region such that the position within the display region no longer tracks the real-world positioning of the peripheral control device.

20. A storage machine holding instructions executable by a logic machine to:
display a virtual reality scene via a display device;
identify a real-world positioning of a peripheral control device relative to the display device;
capture video of a real-world scene of a physical environment located behind a display region of the display device via a camera; and
display a real-world portal via the display device, the real-world portal including a portion of the real-world scene and simulating a view through the virtual reality scene at a position within the display region,
wherein the position of the real-world portal within the display region tracks a section of a cone that represents a virtual field of view of the peripheral control device that is spaced away and spatially locked to the real-world positioning of the peripheral control device.

* * * * *